(12) United States Patent  
Li et al.

(10) Patent No.: US 7,733,567 B2
(45) Date of Patent: Jun. 8, 2010

(54) METHOD AND APPARATUS FOR REDUCING MICROLENS SURFACE REFLECTION

(75) Inventors: Jiutao Li, Boise, ID (US); Jin Li, Boise, ID (US); Ulrich C. Boettiger, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 560 days.

(21) Appl. No.: 11/201,291

(22) Filed: Aug. 11, 2005

(65) Prior Publication Data

US 2007/0035844 A1    Feb. 15, 2007

(51) Int. Cl.
*G02B 27/10* (2006.01)

(52) U.S. Cl. .................. 359/619; 359/620; 359/622

(58) Field of Classification Search .................. 359/619, 359/620–624, 627, 639
See application file for complete search history.

(56) References Cited

U.S. PATENT DOCUMENTS

| | | | | |
|---|---|---|---|---|
| 3,652,150 | A * | 3/1972 | Berreman | 359/667 |
| 6,288,842 | B1 | 9/2001 | Florczak et al. | |
| 6,301,051 | B1 | 10/2001 | Sankur | |
| 6,586,811 | B2 * | 7/2003 | Sekine | 257/432 |
| 6,680,762 | B2 * | 1/2004 | Fukuda et al. | 349/95 |
| 6,864,931 | B1 | 3/2005 | Kumar et al. | |
| 7,280,278 | B2 * | 10/2007 | Boettiger et al. | 359/619 |
| 7,321,112 | B2 * | 1/2008 | Stam et al. | 250/216 |
| 2003/0112523 | A1 | 6/2003 | Daniell | |

OTHER PUBLICATIONS

Meriam-Webster online dictionary, http://www.merriam-webster.com/dictionary/at%20least.*

* cited by examiner

*Primary Examiner*—Ricky L Mack
*Assistant Examiner*—Brandi N Thomas
(74) *Attorney, Agent, or Firm*—Dickstein Shapiro LLP

(57) ABSTRACT

A microlens has a surface with an effective index of refraction close to the index of air to reduce reflection caused by change in indices of refraction from microlens to air. The microlens having an index of refraction approximately the same as that of air is obtained by providing a rough or bumpy lens-air surface on the microlens. Features protrude from the surface of a microlens to create the rough surface and preferably have a length of greater or equal to a wavelength of light and a width of less than a sub-wavelength of light, from about $1/10$ to $1/4$ of the wavelength of light. The features may be of any suitable shape, including but not limited to triangular, cylindrical, rectangular, trapezoidal, or spherical and may be formed by a variety of suitable processes, including but not limited to mask and etching, lithography, spray-on beads, sputtering, and growing.

32 Claims, 7 Drawing Sheets

METHOD AND APPARATUS FOR REDUCING MICROLENS SURFACE REFLECTION

FIELD OF THE INVENTION

The present invention relates generally to a microlens for use in a CMOS image sensor and in particular to a microlens having reduced microlens surface reflection, and a method for producing the same.

BACKGROUND OF THE INVENTION

Microlenses are used to funnel light of a larger area into a photodiode of an imager pixel, for example. Microlenses also can be used to trap light into a solar cell, as well as to project light from a light-producing component of a display. Advanced products and systems that utilize microlenses in these and other similar ways include, without limitation, digital cameras, flat-panel visual displays, and solar panels. Such products and systems are used in a wide variety of applications ranging from mobile phone displays and flat-screen televisions to mapping the solar system, and beyond.

The direction that light is propagated through two media, such as air and a lens, is based on the relationship between the refractive indices of the media. Snell's Law (Eq. 1) relates the indices of refraction n of the two media to the directions of propagation in terms of angles to the normal:

$$n_1 \sin \theta_1 = n_2 \sin \theta_2 \quad (1)$$

The index of refraction (n) is defined as the speed of light in vacuum (c) divided by the speed of light in the medium (v), as represented by Eq. 2:

$$n = c/v \quad (2)$$

The refractive index of a vacuum is 1.000. The refractive index of air is 1.000277. Representative materials used in microlens and semiconductor device fabrication include oxide, with a refractive index of 1.45, and nitride, with a refractive index of 2.0. FIG. 1 illustrates the relationship between the indices of refraction at the air-microlens interface. The graph on the right side of FIG. 1a shows a constant index of refraction in the air and a different constant index of refraction at all depths of the microlens, and therefore a sharp increase in the index of refraction at the air-microlens interface.

When light travels from a medium with a low refractive index, such as air, to a medium with a high refractive index (the incident medium), such as nitride, the angle of light with respect to the normal will increase. In addition, some light will be reflected. This will reduce the efficiency of the imaging system, since not all of the light hitting the lens will travel through the lens to the photodiode, for example.

Reflection at the interface of two different media can be quantified by the following formula (Eq. 3):

$$R = (n_1 - n_2)^2 / (n_1 + n_2)^2 \quad (3)$$

Therefore, reflection from the interface between the two media can be reduced by matching their indices of refraction as closely as possible. As noted above, the refractive index of oxide is significantly closer to 1.0 than that of nitride. By providing an outer layer on a lens having an index of refraction closer to that of the surrounding medium, such as that of air, reflection is reduced and the efficiency and accuracy of the lens is improved.

Thus, it would be useful to have a microlens having a graded refractive index profile to reduce light reflection.

BRIEF SUMMARY OF THE INVENTION

Exemplary embodiments of the invention provide a microlens having a surface with an index of refraction close to the index of air to reduce reflection caused by the sharp reflective index change from microlens to air. A gradual index change is obtained at the surface by providing a microlens having a rough or bumpy lens-air surface. Features protrude from the surface of a microlens to create the rough surface and preferably have a length of greater or equal to a wavelength of light and a width of less than a sub-wavelength of light, from about 1/10 to 1/4 of the wavelength of light. The wavelength is in the range of 400 nm to 700 nm, however the performance of the invention is not necessarily related to the visible wavelength of light. The features may be of any suitable shape, including but not limited to triangular, cylindrical, rectangular, trapezoidal, or spherical and may be formed by a variety of suitable processes, including but not limited to mask and etching, lithography, spray-on beads, sputtering, and growing.

BRIEF DESCRIPTION OF THE DRAWINGS

The above and other advantages and features of the invention will be more clearly understood from the following detailed description which is provided in connection with the accompanying drawings.

FIG. 2b is a cross-sectional view of a plurality of microlenses shown in FIG. 2a;

FIG. 2c is a three-dimensional close-up view of the microlens of FIG. 2a;

DETAILED DESCRIPTION OF PREFERRED EMBODIMENTS

In the following detailed description, reference is made to the accompanying drawings which form a part hereof and illustrate specific exemplary embodiments by which the invention may be practiced. It should be understood that like reference-numerals represent like-elements throughout the drawings. These embodiments are described in sufficient detail to enable those skilled in the art to practice the invention, and it is to be understood that other embodiments may be utilized, and that structural, logical and electrical changes may be made without departing from the spirit and scope of the present invention.

The term "substrate" is to be understood as including silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "substrate" in the following description, previous process steps may have been utilized to form regions or junctions in the base semiconductor structure or foundation. In addition, the semiconductor need not be silicon-based, but could be based on silicon-germanium, germanium, or gallium arsenide, for example.

The term "light" refers to electromagnetic radiation that can produce a visual sensation (visible light) as well as electromagnetic radiation outside of the visible spectrum. In general, light as used herein is not limited to visible radiation, but refers more broadly to the entire electromagnetic spectrum, particularly electromagnetic radiation that can be converted by a solid state photosensor into a useful signal.

Figure 1A:
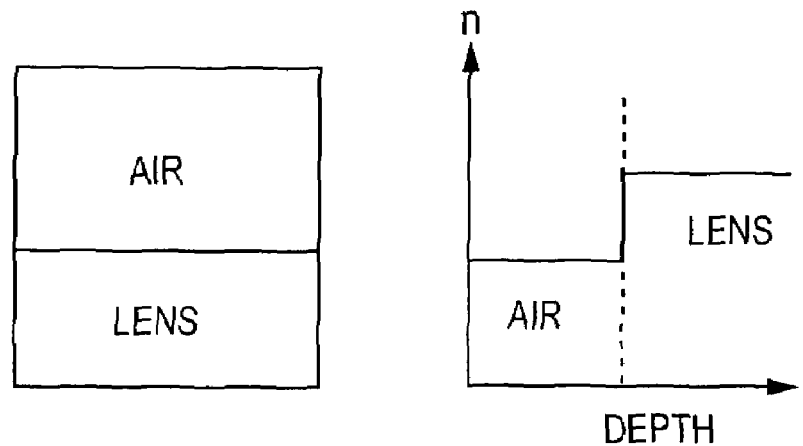
FIG. 1a is a graph of depth vs. indices of refraction at the air-microlens interface of a microlens of prior art.
Figure 1B:
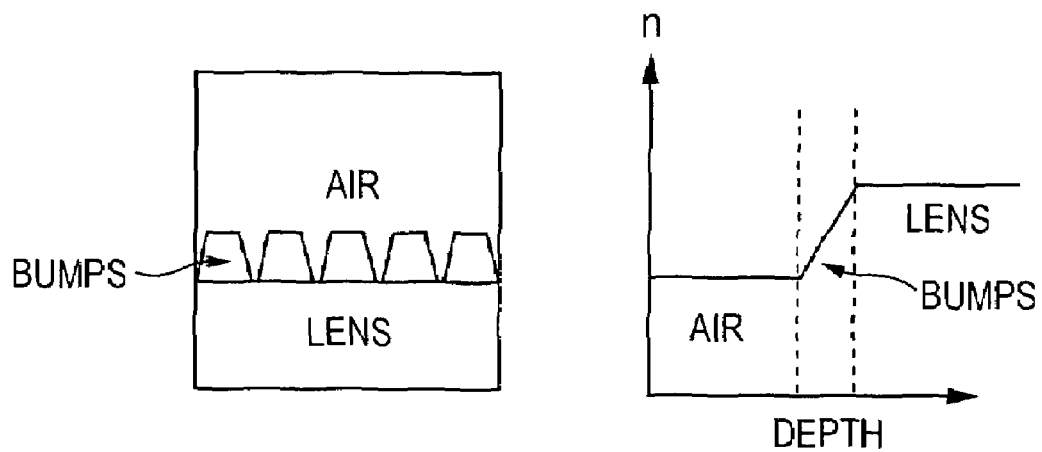
FIG. 1b is a graph of depth vs. indices of refraction at the air-microlens interface of a microlens according to an exemplary embodiment of the invention.
Figure 2A:
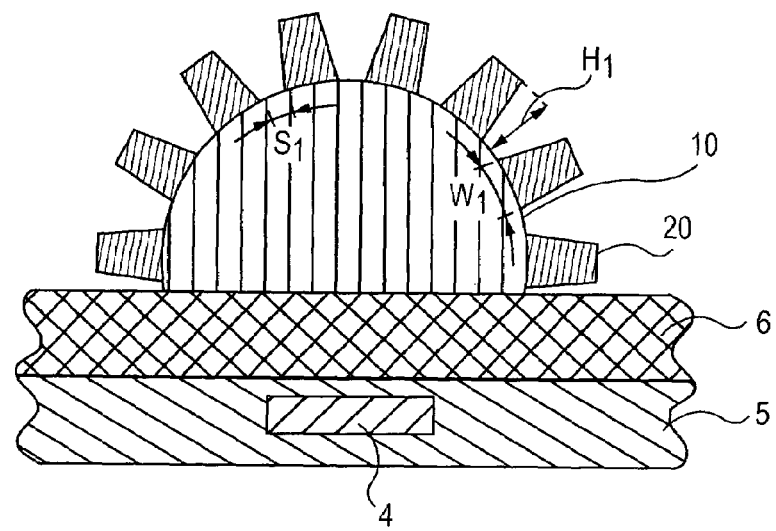
FIG. 2a is a cross-sectional view of a microlens according to an exemplary embodiment of the invention.
Figure 2B:
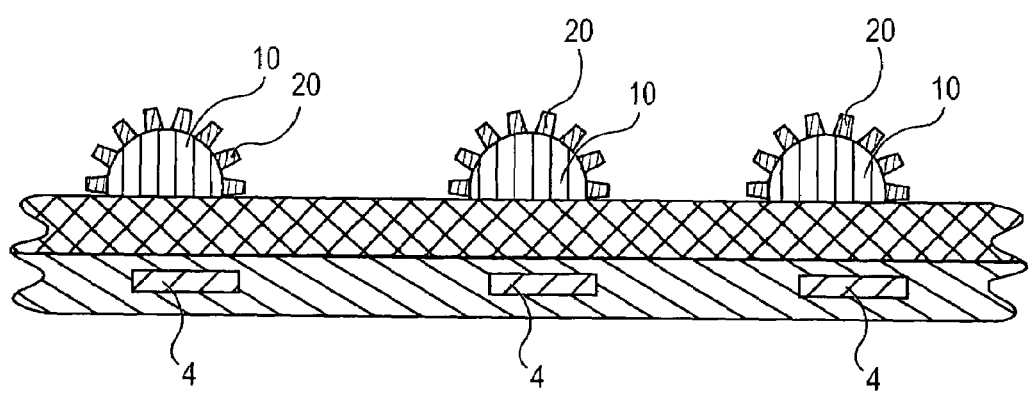

Referring now to the drawings, where like elements are designated by like reference numerals, FIG. 2a illustrates a cross-section of a microlens 10 in an exemplary embodiment of the invention. FIG. 2b illustrates a cross-section of a plurality of such microlenses 10. The microlens 10 is formed above a pixel cell 4, which is formed in a substrate 5. There may be one or more intermediate layers between the substrate 5 and microlens 10, including, but not limited to, interlayer dielectric layers, metal layers, passivation and/or insulation layers. These intermediate layers are represented in FIG. 2a as layer 6.

Figure 2C:
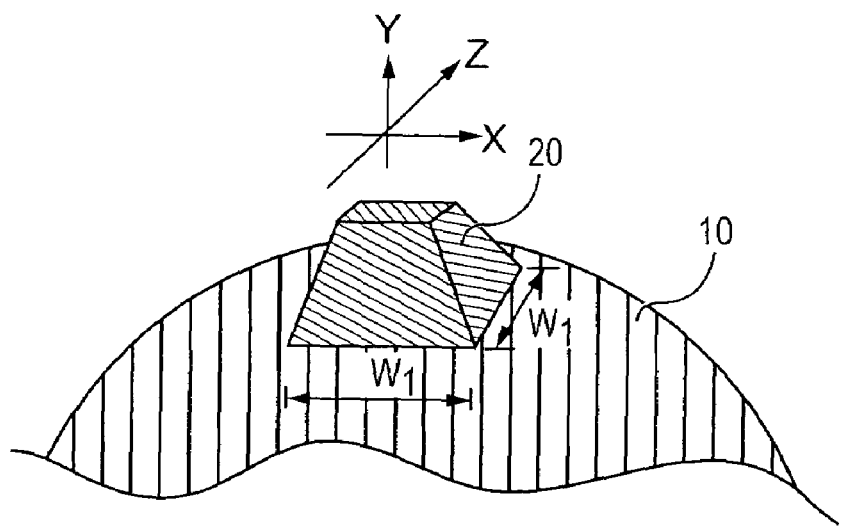

Bumps 20, or grating, are formed on the surface of microlens 10. The bumps 20 have a trapezoidal shape. The bumps 20 preferably have a height $h_1$ equal to or greater than a wavelength of light. The wavelength of light is in the range of approximately 400 nm to 700 approximately nm. The bumps 20 preferably have a width $w_1$ along the x- and z-axes, as shown in the close-up three-dimensional illustration of FIG. 2c. Width $w_1$ is much less than a subwavelength of light, preferably in the range of approximately 10 nm to approximately 100 nm. The bumps 20 may be spaced apart by $s_1$, wherein $s_1$ is preferably in the range of approximately 10 nm to approximately 100 nm. For ease of explanation, the bumps 20 that are located behind the section plane of FIG. 2a are not shown. In the preferred embodiment, however, the bumps are located across the entire curved surface of the microlens 10. Thus, the spacing $s_1$ separates the bumps 20 that are shown in FIG. 2a from those located (but not shown) in front of and behind the illustrated bumps.

The bumps 20 may comprise any suitable material such as oxides, nitrides, and metals. Light transmissive materials are more preferable.

The bumps 20 may be formed by methods such as depositing the material and ion-etching the trapezoidal shape over the microlens 10. Forming the bumps 20 by etching provides accurate control in shaping the bumps, however other methods are also possible. For example, the bumps 20 may also be formed by depositing a photoresist over the material and etching by photolithography. If formed by photolithography, the bumps 20 would have a parallel orientation relative to each other, as represented by bumps 40 in FIG. 4. The bumps 20 may also be formed by preparing the microlens 10 surface with a plasma vapor deposition process, spin developing, or spin wetting to deposit the material and growing the bumps 20. The bumps 20 may also be formed by forming studs in the microlens 10 and etching away the surface of the microlens to expose the bumps 20.

Figure 3:
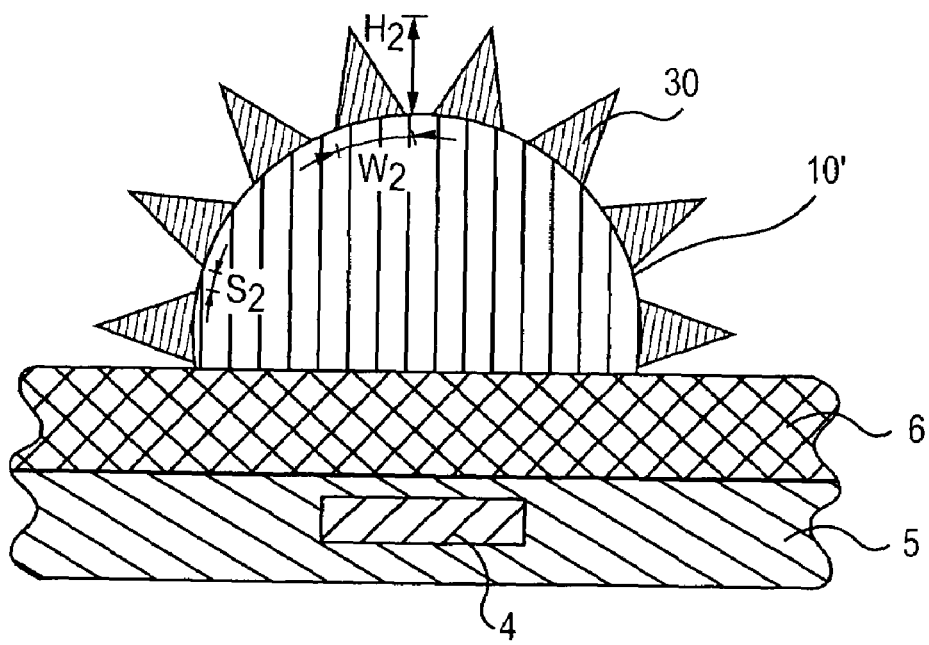
FIG. 3 is a cross-sectional view of a microlens according to another exemplary embodiment of the invention.

FIG. 3 illustrates a cross-section of microlens 10 in another exemplary embodiment of the invention. In this embodiment, the microlens 10 features bumps 30 having a triangular shape. Bumps 30 preferably have a height $h_2$ equal to or greater than a wavelength of light. The wavelength of light is in the range of approximately 400 nm to approximately 700 nm. The bumps 30 preferably have a width $w_2$ along the x- and z-axes, as with bumps 20 of FIG. 2c. Width $w_2$ is much less than a subwavelength of light, preferably in the range of approximately 10 nm to approximately 100 nm in the x- and z-axes of said features. The bumps 30 may be spaced apart by $s_2$, wherein $s_2$ is preferably in the range of approximately 10 nm to approximately 100 nm.

Like the bumps 20 of FIG. 2a, the bumps 30 of FIG. 3 may comprise any suitable material such as oxides, nitrides, and metals; light transmissive materials are more preferable and materials such as metals are less preferable. The bumps 30 may be formed by methods such as depositing the material and etching the triangular shape over the microlens 10'. Forming the bumps 30 by etching provides accurate control in shaping the bumps, however other methods are also possible. The bumps 30 may also be formed by depositing a photoresist over the material and etching by photolithography. If formed by photolithography, the bumps 30 would have a parallel orientation relative to each other, as represented by bumps 40 in FIG. 4 (described below). The bumps 30 may also be formed by preparing the microlens 10' surface with a plasma vapor deposition process, spin developing, or spin wetting to deposit the material and growing the bumps 30. The bumps 30 may also be formed by forming studs in the microlens 10' and etching away the surface of the microlens to expose the bumps 30.

Figure 4:
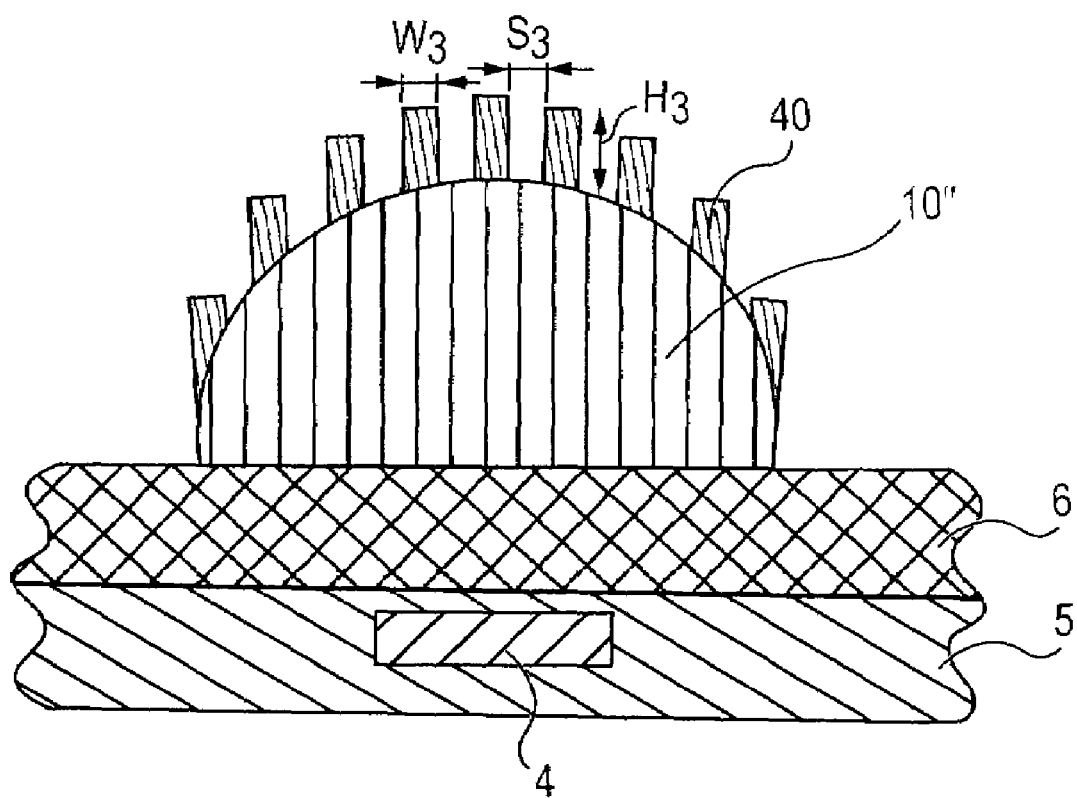
FIG. 4 is a cross-sectional view of a microlens according to another exemplary embodiment of the invention.

FIG. 4 illustrates a cross-section of microlens 10" in another exemplary embodiment of the invention. In this embodiment, the microlens 10" features bumps 40 having a rectangular shape and are arranged in an approximately parallel configuration. Bumps 40 preferably have a height $h_3$ equal to or greater than a wavelength of light. The wavelength of light is in the range of approximately 400 nm to approximately 700 nm. The bumps 40 preferably have a width $w_3$ along the x- and z-axes, as with bumps 20 of FIG. 2c. Width $w_3$ is much less than a subwavelength of light, preferably in the range of approximately 10 nm to approximately 100 nm. The bumps 40 may be spaced apart by $s_3$, wherein $s_3$ is preferably in the range of approximately 10 nm to approximately 100 nm.

Like the bumps 20 and 30 of FIGS. 2a and 3, respectively, the bumps 40 of FIG. 4 may comprise any suitable material such as oxides, nitrides, and metals; light transmissive materials are more preferable and materials such as metals are less preferable. The bumps 40 may be formed by depositing a photoresist over the material and etching by photolithography. Using this method, the bumps 40 may also be formed perpendicular to the surface of the microlens 10", as represented by bumps 10 in FIG. 2. Forming the bumps 40 by photolithography requires few processing steps and accurate control in shaping rectangular bumps, however other methods are also possible. For example, the bumps 40 may be formed by methods such as depositing the material and etching the rectangular shape over the microlens 10". The bumps 40 may also be formed by preparing the microlens 10" surface with a plasma vapor deposition process, spin developing, or spin wetting to deposit the material and growing the bumps 40. The bumps 40 may also be formed by forming studs in the microlens 10" and etching away the surface of the microlens to expose the bumps 40.

Figure 5A:
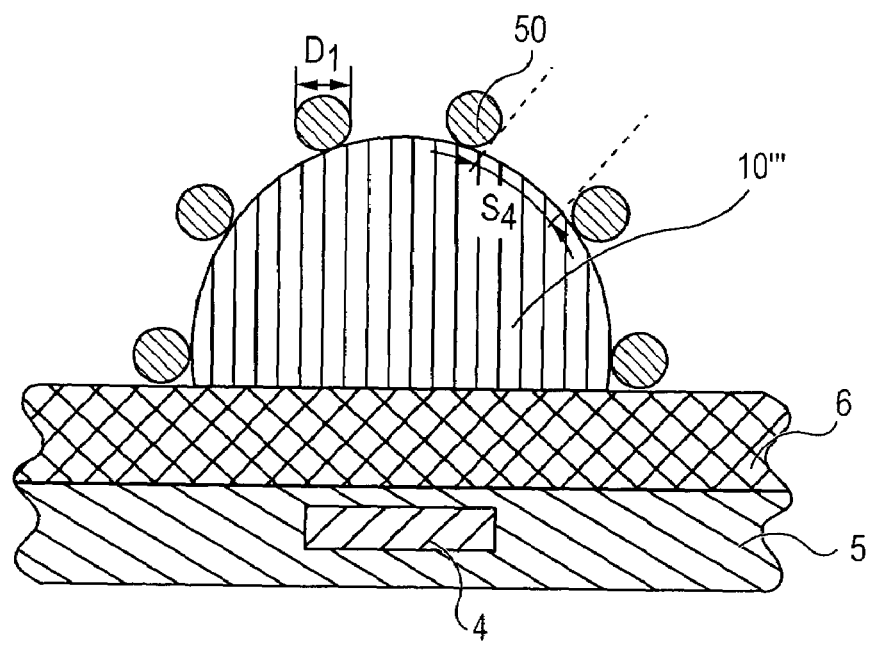
FIG. 5a is a cross-sectional view of a microlens according to another exemplary embodiment of the invention.

FIG. 5a illustrates a cross-section of microlens 10'" in another exemplary embodiment of the invention. In this embodiment, the microlens 10'" features bumps 50 having a spherical shape. Because the bumps 50 are spherical in shape, the height to wavelength and width to subwavelength ratios (and thus the height to width ratio) of the embodiments illustrated in FIGS. 2-4 are not attainable and therefore cannot lower the index of refraction of the surface of the microlens 10''' as much as the other embodiments. However, the embodiment of FIG. 5a has the advantage of ease of processing. The bumps 50, like the bumps 20, 30, and 40 of FIGS. 2-4, may comprise any suitable material such as oxides, nitrides, and metals; light transmissive materials are more preferable and materials such as metals are less preferable. They may also be formed using the same methods of formation as described above with respect to bumps 20, 30 and 40. However, the bumps 50 may also be sprayed and adhered to the surface of the microlens 10''', which is a simpler processing method than any of the aforementioned processes for the formation of spherical bumps 50.

The bumps 50 have a diameter $d_1$ in the range of approximately 100 nm to approximately 500 nm, preferably in the range of approximately 200 nm to 300 nm. The bumps 50 are preferably spaced apart by $s_4$, wherein $s_4$ is preferably in the range of approximately 100 nm to approximately 500 nm.

Figure 5B:
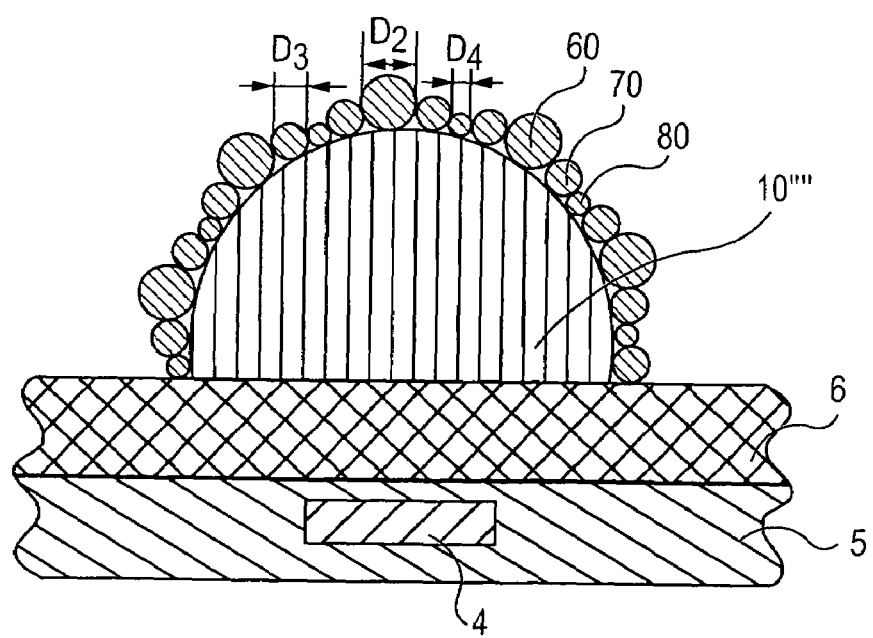
FIG. 5b is a cross-sectional view of a microlens according to another exemplary embodiment of the invention.

Another embodiment employing bumps having a spherical shape is shown in FIG. 5b. The bumps 60, 70, 80 have diameters $d_1$, $d_2$, $d_3$ in the range of approximately 100 nm to approximately 500 nm, preferably in the range of approximately 200 nm to 300 nm.

The formation of bumps on the surface of a microlens creates a surface with an index of refraction close to the index of air to reduce reflection caused by the sharp reflective index change from microlens to air. A gradual index change is obtained at the surface by providing a microlens having a rough or bumpy lens-air surface. Therefore, reflection from the interface between the two media can be reduced by matching their indices of refraction as closely as possible. By providing an outer layer on a lens having an index of refraction closer to that of the surrounding medium, such as that of air, reflection is reduced and the efficiency and accuracy of the lens is improved.

Figure 6:
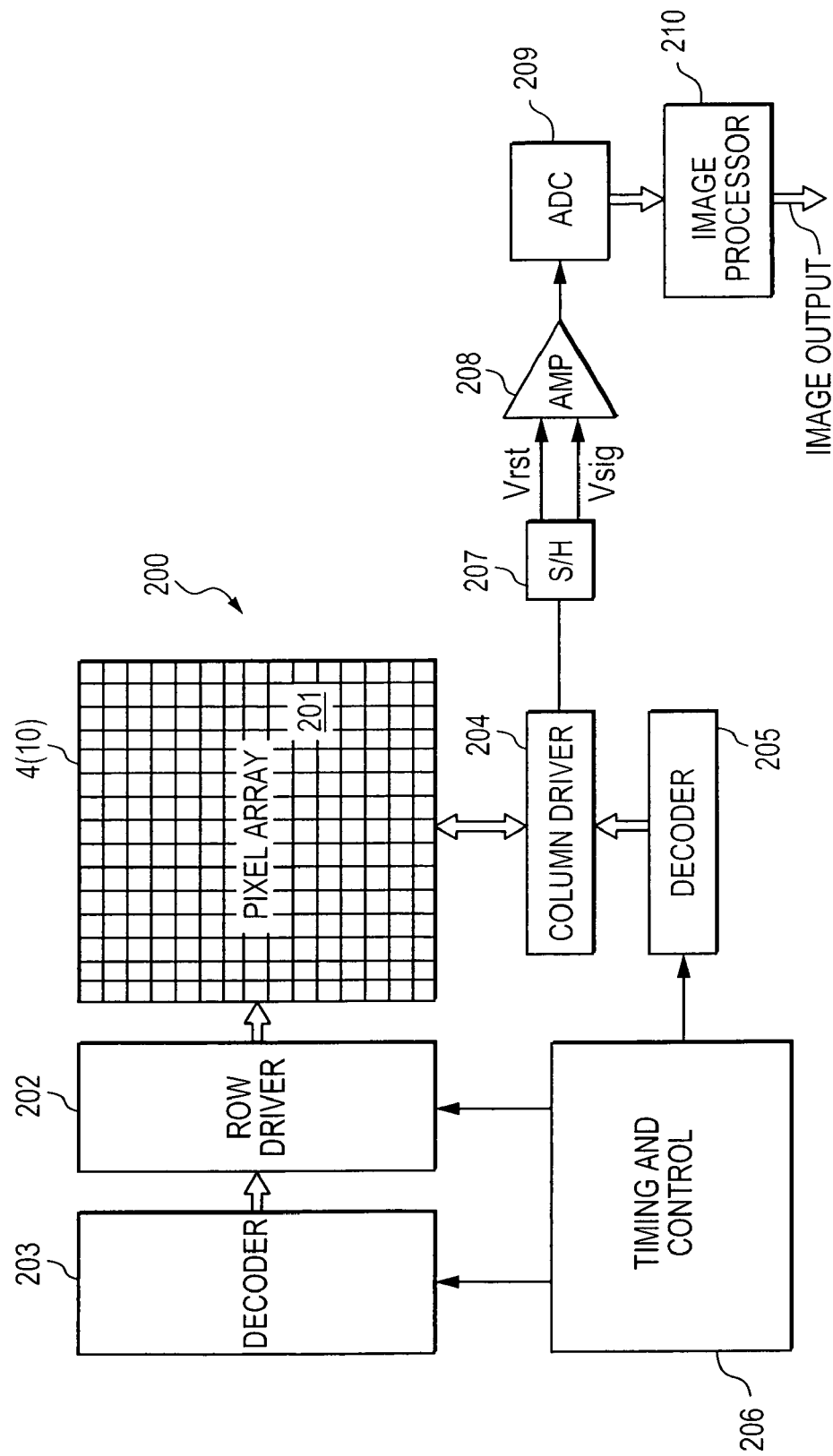
FIG. 6 is a schematic of an imaging device using a pixel having a microlens constructed in accordance with an embodiment of the invention.

FIG. 6 illustrates an exemplary imaging device 200 that may utilize pixels having microlenses constructed in accordance with the invention. The imaging device 200 has an imager pixel array 201 comprising a plurality of pixels 4 with microlenses 10 (or 10', 10'', 10''', 10'''') constructed as described above. Row lines are selectively activated by a row driver 202 in response to row address decoder 203. A column driver 204 and column address decoder 205 are also included in the imaging device 200. The imaging device 200 is operated by the timing and control circuit 206, which controls the address decoders 203, 205. The control circuit 206 also controls the row and column driver circuitry 202, 204.

A sample and hold circuit 207 associated with the column driver 204 reads a pixel reset signal Vrst and a pixel image signal Vsig for selected pixels. A differential signal (Vrst-Vsig) is produced by differential amplifier 208 for each pixel and is digitized by analog-to-digital converter 209 (ADC). The analog-to-digital converter 209 supplies the digitized pixel signals to an image processor 210 which forms and outputs a digital image.

Figure 7:
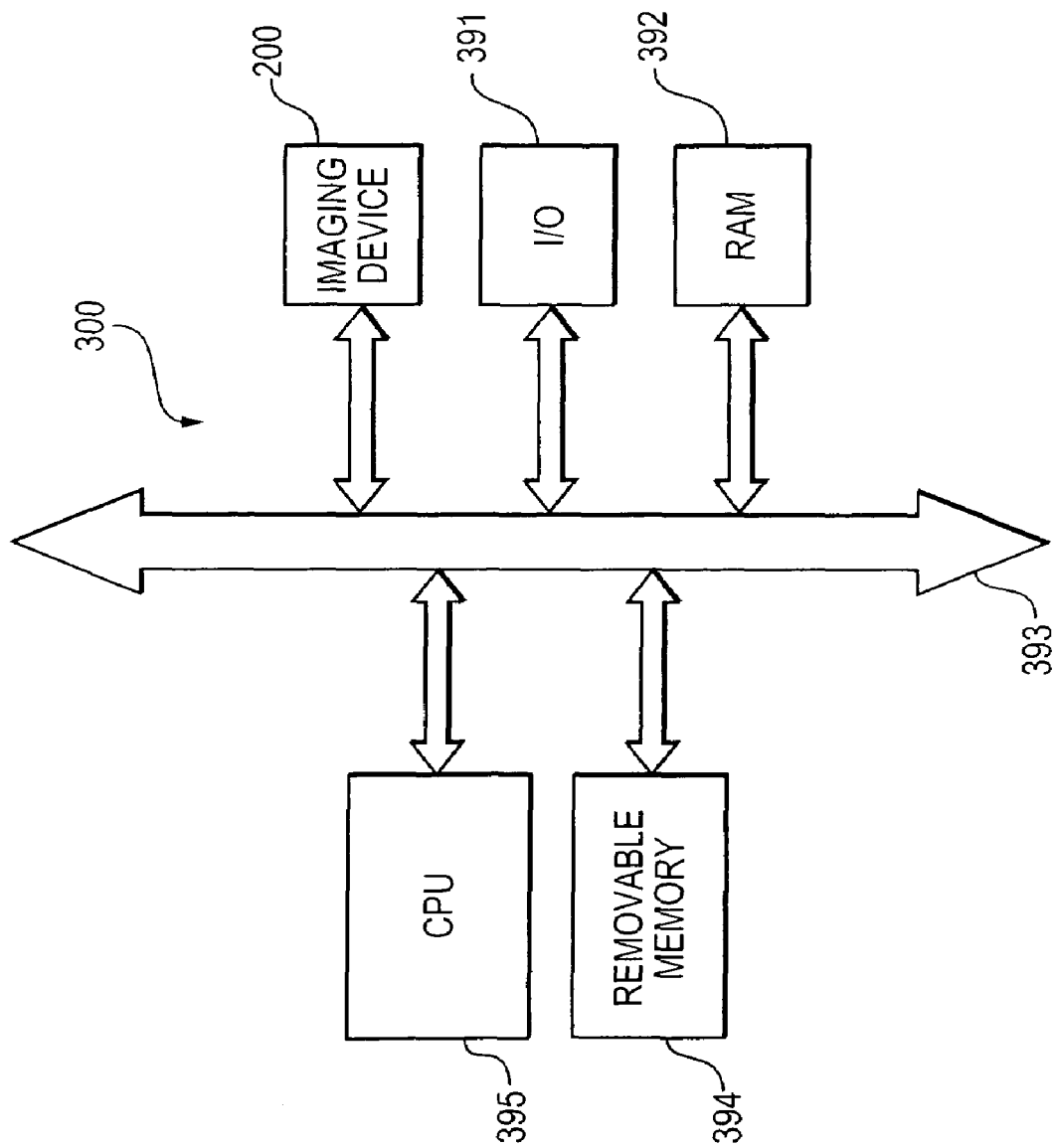
FIG. 7 illustrates a schematic of a processing system including the imaging device of FIG. 6.

FIG. 7 shows system 300, a typical processor system modified to include the imaging device 200 (FIG. 6) of the invention. The processor-based system 300 is exemplary of a system having digital circuits that could include image sensor devices. Without being limiting, such a system could include a computer system, still or video camera system, scanner, machine vision, vehicle navigation, video phone, surveillance system, auto focus system, star tracker system, motion detection system, image stabilization system, and data compression system.

The processor-based system 300, for example a camera system, generally comprises a central processing unit (CPU) 395, such as a microprocessor, that communicates with an input/output (I/O) device 391 over a bus 393. Imaging device 200 also communicates with the CPU 395 over bus 393. The processor-based system 300 also includes random access memory (RAM) 392, and can include removable memory 394, such as flash memory, which also communicate with CPU 395 over the bus 393. Imaging device 200 may be combined with a processor, such as a CPU, digital signal processor, or microprocessor, with or without memory storage on a single integrated circuit or on a different chip than the processor.

Although the above discussion describes the bumps as being formed in trapezoidal, triangular, rectangular, and spherical, it should be noted that the bumps and their formation are not limited to such embodiments. Other materials and methods may be used to form the bumps that are used to lower the index of refraction of the surface of the microlens.

Various applications of the methods of the invention will become apparent to those of skill in the art as a result of this disclosure. Although certain advantages and embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the appended claims.

What is claimed as new and desired to be protected by Letters Patent of the United States is:

1. A pixel array comprising:
   a plurality of pixels; and
   an array of microlenses over said plurality of pixels, wherein each of said microlenses has a first index of refraction at a bumpy outer layer of said microlens and a second index of refraction inside said microlens, medial to said outer layer, said outer layer of each microlens including a plurality of bumps protruding from the surface of the microlens.

2. The pixel array of claim 1, wherein said at least one microlens has an index of refraction approximately the same as the index of refraction of air at the air-microlens surface of said microlens.

3. The pixel array of claim 1, wherein said at least one microlens has a rough air-microlens surface.

4. The pixel array of claim 3, wherein said air-microlens surface has a plurality of features on said air-microlens surface.

5. The pixel array of claim 4, wherein said features have a height that is at least a wavelength of light.

6. The pixel array of claim 4, wherein said features have a width that is less than a sub-wavelength of light.

7. The pixel array of claim 4, wherein said features have a trapezoidal cross-section in the x- and z-axes of said features.

8. The pixel array of claim 4, wherein said features have a triangular cross-section in the x- and z-axes of said features.

9. The pixel array of claim 4, wherein said features have a rectangular cross-section in the x- and z-axes of said features.

10. The pixel array of claim 4, wherein said features have a spherical shape.

11. An imager device comprising:
    a plurality of pixels; and an array of microlenses over said plurality of pixels, wherein each of said microlenses has a surface from which protrudes a plurality of bumps.

12. The imager device of claim 11, wherein said bumps have a height that is at least a wavelength of light.

13. The imager device of claim 11, wherein said bumps have a width that is less than a sub-wavelength of light.

14. The imager device of claim 11, wherein said bumps have a trapezoidal cross-section in the x- and z-axes of said features.

15. The imager device of claim 11, wherein said bumps have a triangular cross-section in the x- and z-axes of said features.

16. The imager device of claim 11, wherein said bumps have a rectangular cross-section in the x- and z-axes of said features.

17. The imager device of claim 11, wherein said bumps have a spherical shape.

18. An imager structure comprising:
a plurality of pixels formed in a substrate;
at least one planar layer formed over said plurality of pixels; and
a plurality of microlenses over said plurality of pixels having a first index of refraction, each microlens having a bumpy refractive layer at a top surface of said microlenses having a second index of refraction, the bumpy refractive layer comprising a plurality of bumps protruding from the top surface of each microlens.

19. The imager device of claim 18, wherein said second index of refraction is closer to the index of refraction of air than said first index of refraction.

20. The imager device of claim 19, wherein said refractive layer comprises a plurality of structures.

21. The imager device of claim 19, wherein said plurality of structures have a height that is at least a wavelength of light and a width that is less than a sub-wavelength of light.

22. A method of making a pixel array comprising:
forming a plurality of pixels in a substrate;
forming a plurality of microlenses over said plurality of pixels; and
forming a plurality of bumps on protruding from a top surface of each of said microlenses.

23. The method of claim 22, wherein said step of forming a plurality of bumps further comprises forming bumps having rectangular cross-sections.

24. The method of claim 22, wherein said step of forming a plurality of bumps further comprises forming bumps having trapezoidal cross-sections.

25. The method of claim 22, wherein said step of forming a plurality of bumps further comprises forming cylindrical bumps.

26. The method of claim 22, wherein said step of forming a plurality of bumps further comprises forming spherical bumps.

27. The method of claim 22, wherein said step of forming a plurality of bumps further comprises forming bumps having triangular cross-sections.

28. The method of claim 22, wherein said step of forming a plurality of bumps comprises a photolithography process.

29. The method of claim 22, wherein said step of forming a plurality of bumps comprises a ion etching process.

30. The method of claim 22, wherein said step of forming a plurality of bumps comprises a plasma vapor deposition process.

31. The method of claim 22, wherein said step of forming a plurality of bumps comprises a spin developing process.

32. The method of claim 31, wherein said step of forming a plurality of bumps comprises a spraying process.

* * * * *